Figures 1, 2:
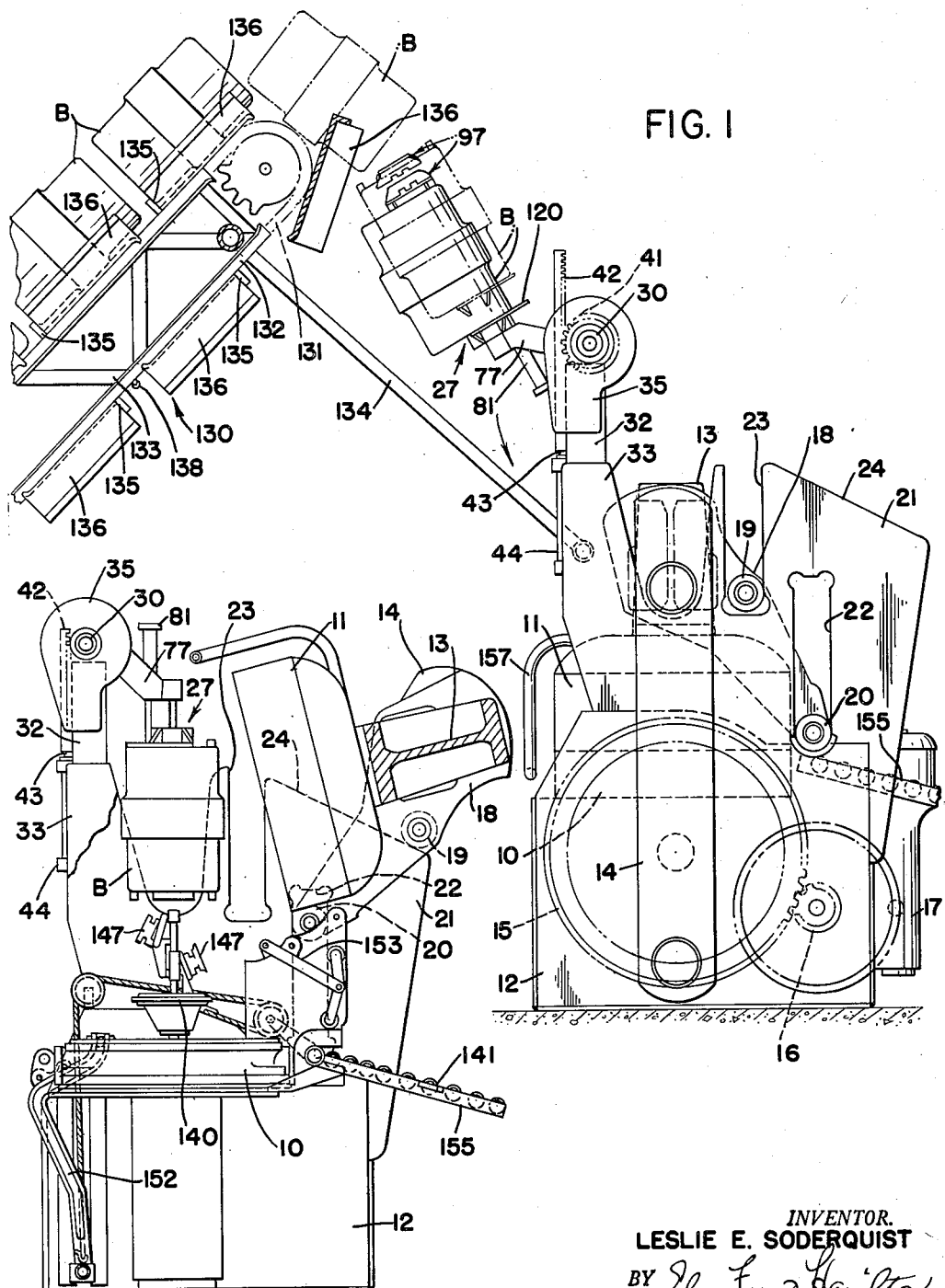

March 28, 1961   L. E. SODERQUIST   2,976,566
GREEN TIRE LOADING AND CENTERING MECHANISM
Filed Jan. 20, 1959   8 Sheets-Sheet 1

INVENTOR.
LESLIE E. SODERQUIST
BY
ATTORNEYS

March 28, 1961 L. E. SODERQUIST 2,976,566
GREEN TIRE LOADING AND CENTERING MECHANISM
Filed Jan. 20, 1959 8 Sheets-Sheet 2
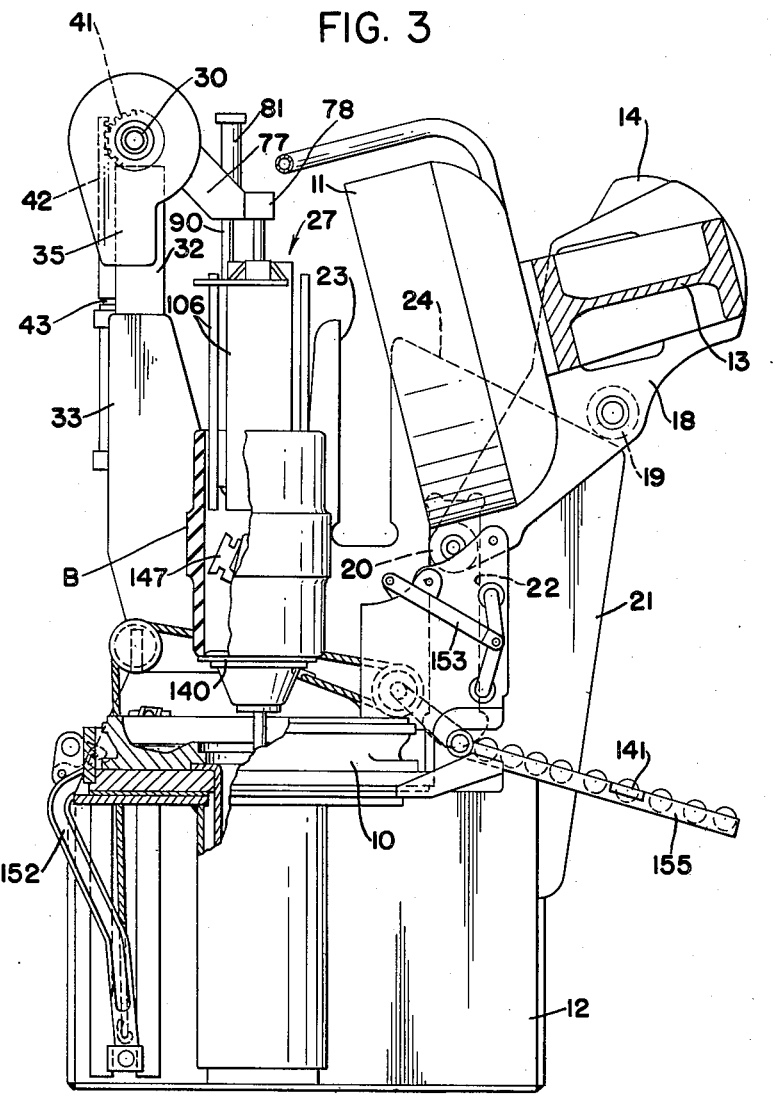
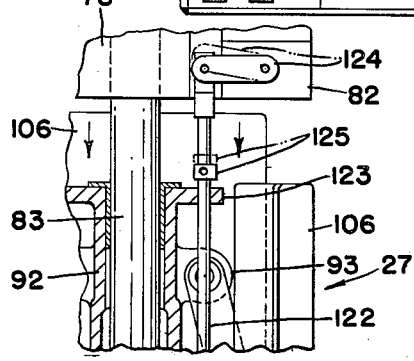
INVENTOR.
LESLIE E. SODERQUIST
BY
ATTORNEYS March 28, 1961 L. E. SODERQUIST 2,976,566
GREEN TIRE LOADING AND CENTERING MECHANISM
Filed Jan. 20, 1959 8 Sheets-Sheet 3

INVENTOR.
LESLIE E. SODERQUIST
BY
ATTORNEYS

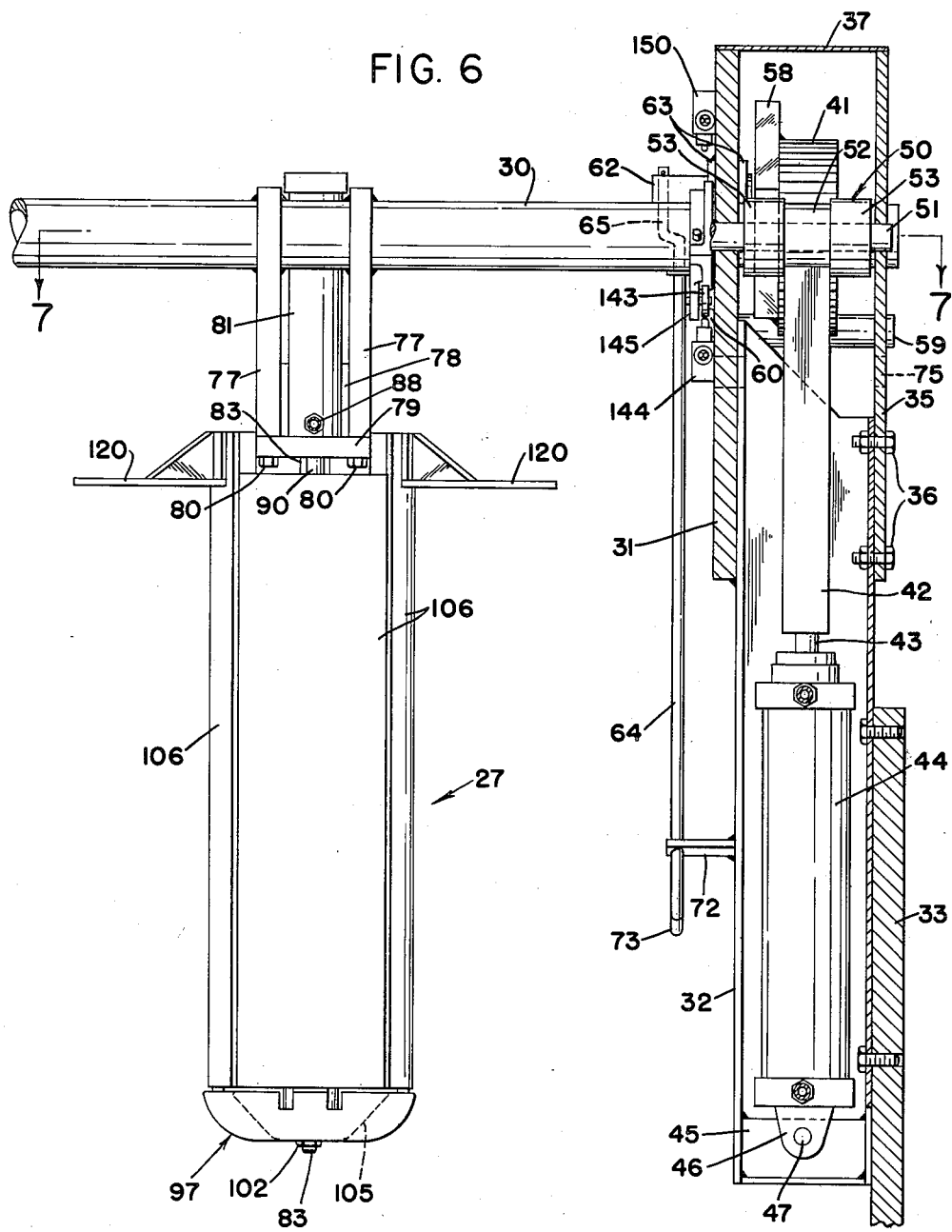

March 28, 1961 L. E. SODERQUIST 2,976,566
GREEN TIRE LOADING AND CENTERING MECHANISM
Filed Jan. 20, 1959 8 Sheets-Sheet 5
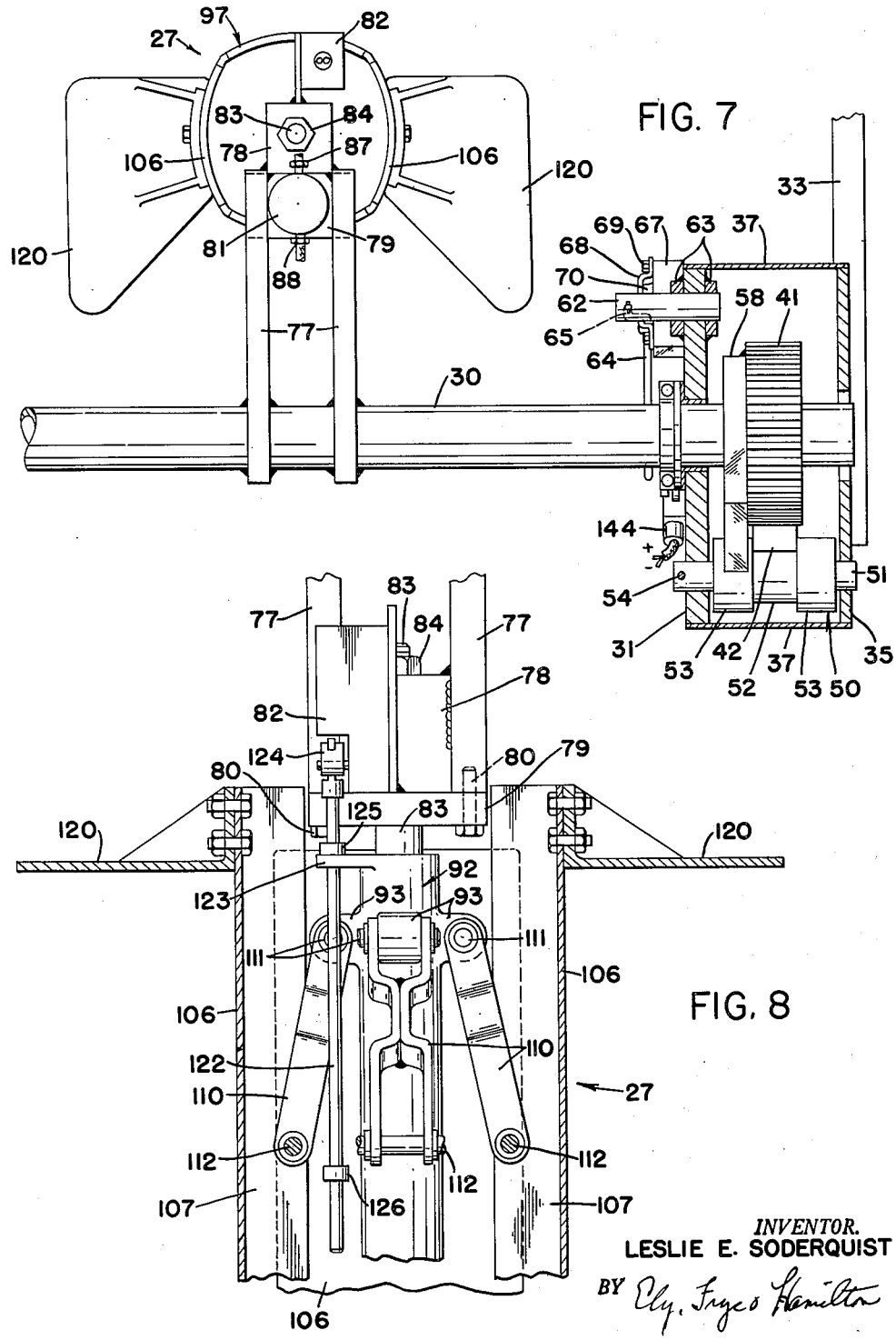
INVENTOR.
LESLIE E. SODERQUIST
BY
ATTORNEYS March 28, 1961 L. E. SODERQUIST 2,976,566
GREEN TIRE LOADING AND CENTERING MECHANISM
Filed Jan. 20, 1959 8 Sheets-Sheet 6

INVENTOR
LESLIE E. SODERQUIST
BY
ATTORNEYS

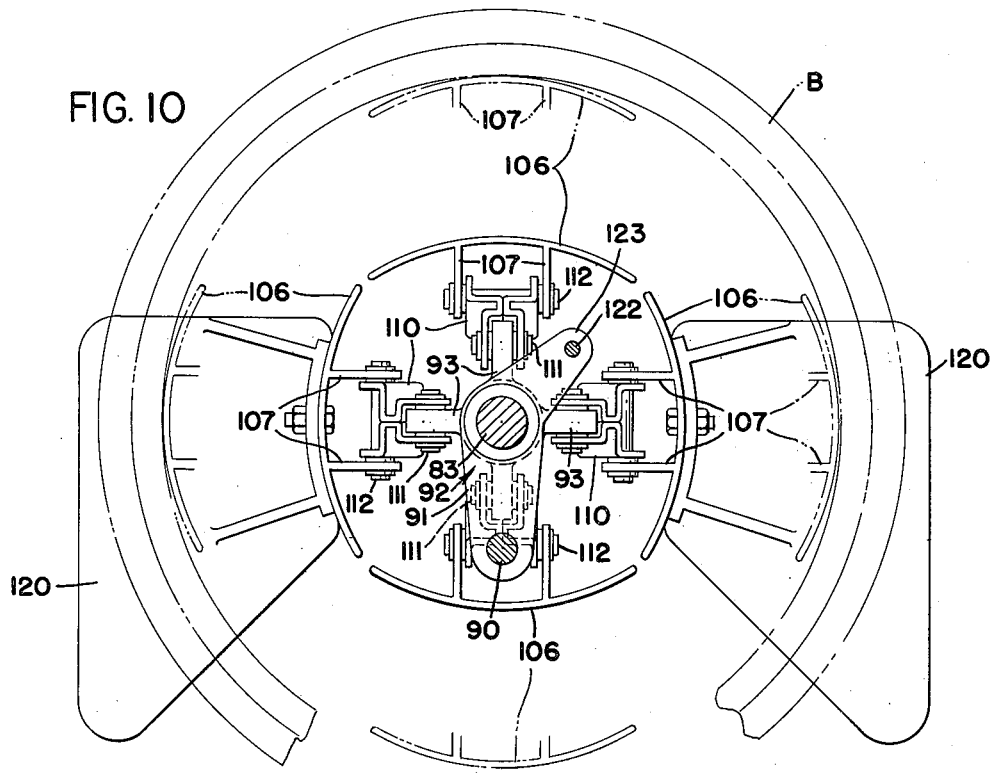
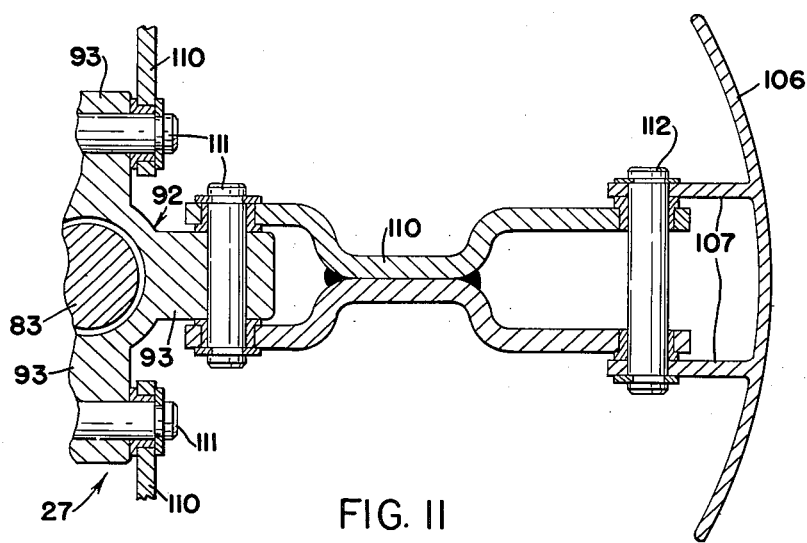

March 28, 1961  L. E. SODERQUIST  2,976,566
GREEN TIRE LOADING AND CENTERING MECHANISM
Filed Jan. 20, 1959  8 Sheets-Sheet 8

*INVENTOR.*
LESLIE E. SODERQUIST
BY
ATTORNEYS

2,976,566

GREEN TIRE LOADING AND CENTERING MECHANISM

Leslie E. Soderquist, Silver Lake, Ohio, assignor to The McNeil Machine & Engineering Company, Akron, Ohio, a corporation of Ohio Filed Jan. 20, 1959, Ser. No. 787,886

3 Claims. (Cl. 18—2)

This application is a continuation-in-part of applicants' copending application Serial No. 567,555, filed February 24, 1956; now issued as Patent No. 2,927,343.

This invention relates to improvements in presses for the shaping and vulcanizing of pneumatic tires, and more particularly to improved mechanism operating in conjunction with presses of this type for automatically loading such presses with green or uncured tire bands, which after curing are discharged from the presses.

This improved loading and centering mechanism is more particularly adapted for use with presses which handle tubeless tires, and which do not require the use of an air bag or diaphragm in shaping and curing the tires. The user is thus enabled to load the presses, and to form, mold and cure tires without preshaping and without an air bag or diaphragm. However, the loading and centering mechanism may be used also in handling tires which require the use of inner tubes when mounted on a vehicle. Also this mechanism may be used with presses that require the use of an air bag or former, and more particularly with such presses where the former can take no substantial part in guiding and/or centering the green tire band in the press.

While the invention is shown in connection with the operation of a single press, it will be obvious that it may also be used in the operation of dual presses.

In order to successfully equip presses of the type specified with a loading and centering mechanism to serve these presses, the improved mechanism which delivers an uncured tire band to the press and centers it therein must be operated in timed relation to the mechanism which discharges the cured tire, and these operations must in turn be timed properly with the operation of the press itself. An object of the invention is to adequately provide for these several considerations in conjunction with the novel mechanism disclosed herein.

Another object is to provide a loading and centering mechanism for presses which shape and vulcanize pneumatic tires wherein a novel type of loading chuck or drum is used which is extensible and retractable longitudinally, as well as expansible and contractible laterally.

A further object is to provide a tire loading chuck in mechanism of the character referred to, wherein a contracted chuck must first be extended longitudinally before it can be expanded, and wherein an expanded chuck must first be contracted before it can be retracted.

A further object is to provide a tire loading chuck, which after carrying an uncured tire band into position above and in alignment with the lower bead ring, is contracted slowly to deposit the tire band by gravity into proper position on said bead ring, said chuck guiding said band during its downward movement and properly centering it on the lower bead ring. Thereafter the chuck completes its contraction and retraction, after which the lower bead ring with the tire band thereon is lowered into the lower mold section. At this time the lower extremity of the chuck is far enough above the tire band to swing clear thereof during return of the chuck to a position where it receives another uncured tire band to be delivered to the press.

Other objects and advantages will become apparent from the following description taken in conjunction with the accompanying drawings.

Figure 4:
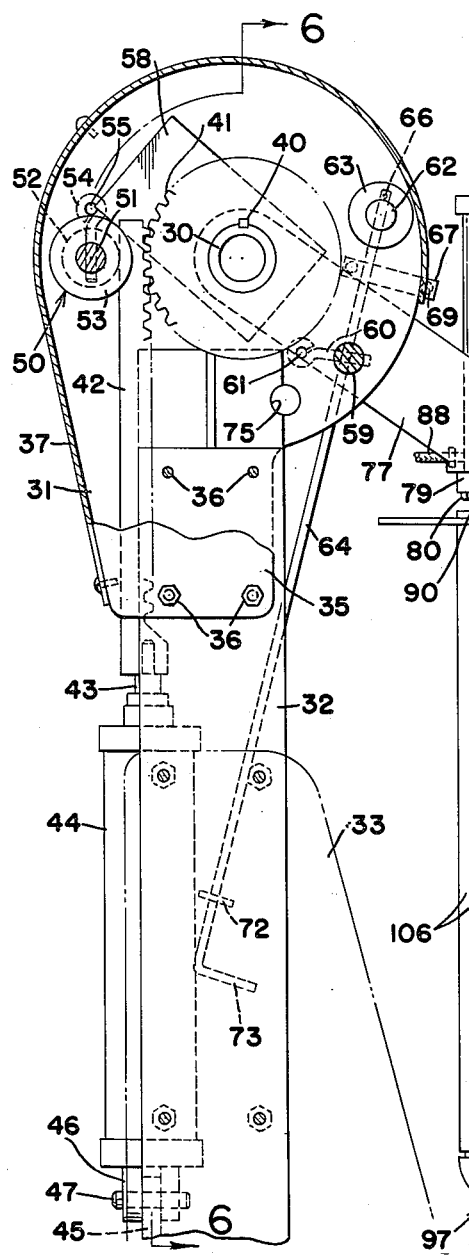
Figure 5:
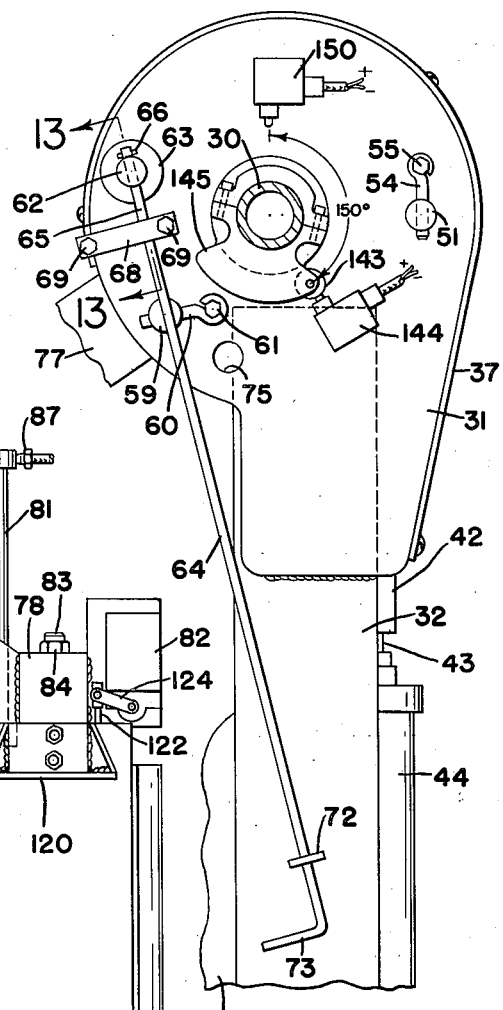
Figure 9:
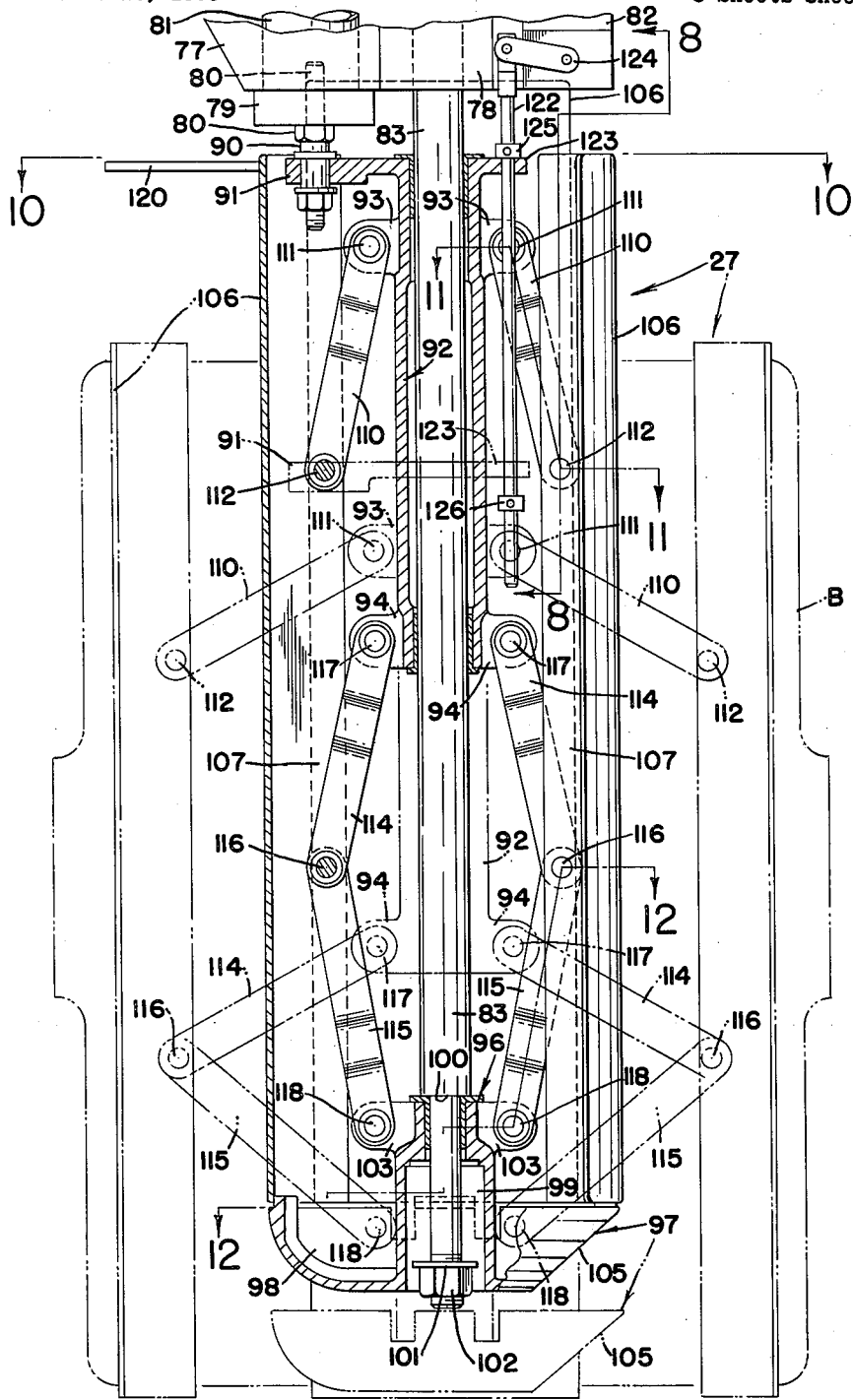
Figure 12:
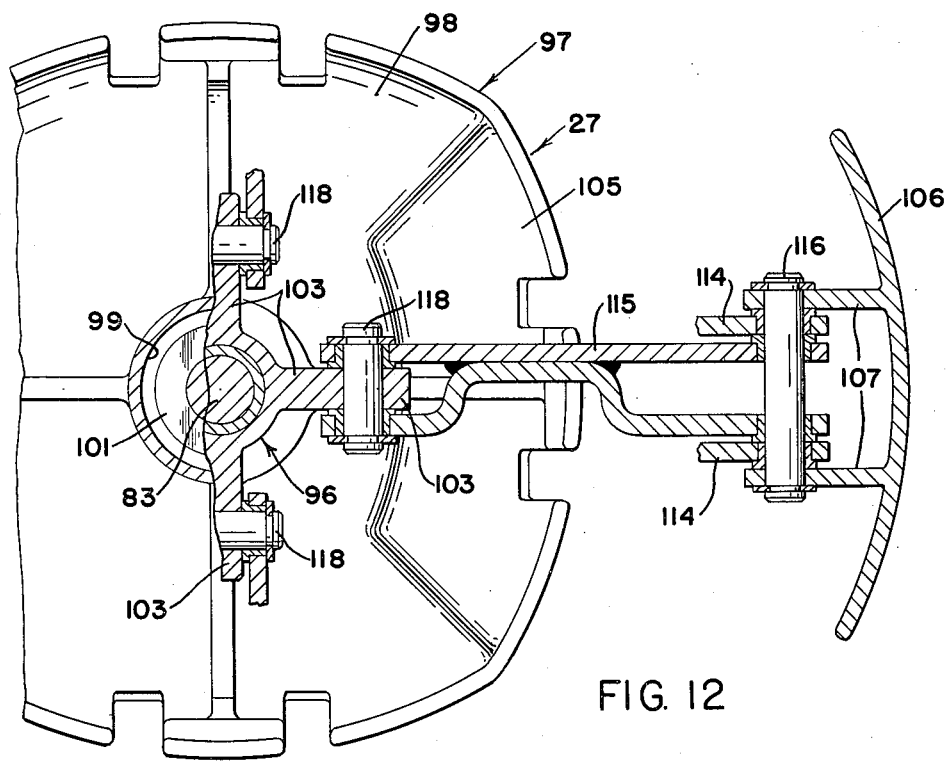
Figure 13:
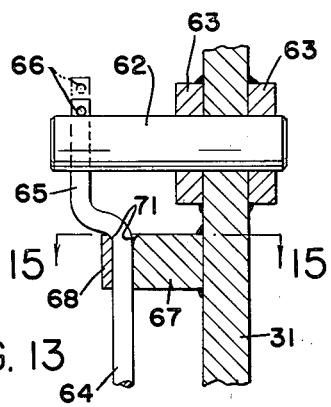
Figure 14:
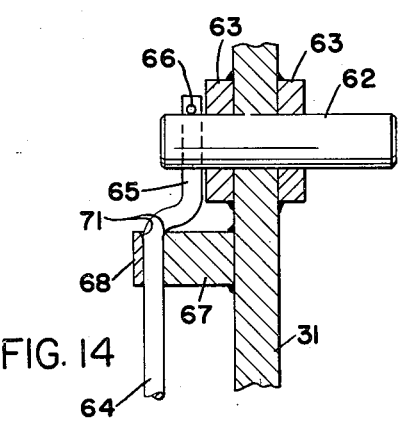
Figure 15:
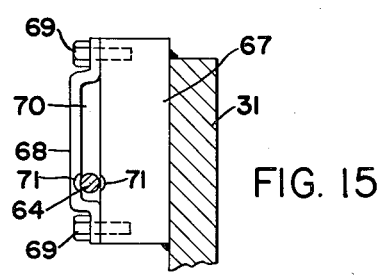

In the drawings:

Fig. 1 is a side elevation of a tire shaping and vulcanizing press in closed position, and equipped with my improved tire loading mechanism, with part being shown of the conveyor for delivering the tire band to said mechanism, of the cured tire ejecting mechanism, and of the conveyor for removing the cured tires from the press, Fig. 2 is a side elevation of the press in open position, with the chuck supporting a green tire band above the lower press section in alignment with the raised lower bead ring, Fig. 3 is an enlarged view similar to Fig. 2 with the uncured tire band resting on the lower bead ring, Fig. 4 is an enlarged side view of the chuck and operating mechanism therefor, with the chuck in its lower vertical position, Fig. 5 is a rear view of part of the mechanism shown in Fig. 4, Fig. 6 is a section taken substantially on line 6—6 of Fig. 4, with some parts, including the chuck, shown in elevation, Fig. 7 is a top plan view of the mechanism shown in Fig. 6, as indicated by the line 7—7 of Fig. 6, Fig. 8 is a fragmentary sectional view, partly in elevation, taken substantially on line 8—8 of Fig. 9, Fig. 9 is an enlarged view of the chuck, partly in section and partly in elevation, with the contracted and retracted position of the chuck sections being shown in full lines, and the expanded and extended position thereof being shown in broken lines, Fig. 9a is a fragmentary view of a portion of Fig. 9 showing the chuck and a limit switch assembly which is operated thereby under certain conditions, Fig. 10 is a view taken substantially in the direction indicated by line 10—10 of Fig. 9, with the view being turned 90° counterclockwise with respect to Fig. 9, Fig. 11 is an enlarged fragmentary section taken substantially on line 11—11 of Fig. 9 with the operating links expanded, Fig. 12 is a similar section taken substantially on line 12—12 of Fig. 9 with the toggle links expanded, Fig. 13 is an enlarged fragmentary view taken substantially on line 13—13 of Fig. 5, Fig. 14 is an alternate view of Fig. 13, and Fig. 15 is a section taken substantially on line 15—15 of Fig. 13.

The type of press which is shown herein and which will be described only to the extent which is necessary for a complete understanding of the invention is shown in a number of prior patents and applications to the present inventor. These presses are well known in the art, and while many of them have been characterized by the provision of an inflatable diaphragm about which the uncured tire band is placed, recent developments have resulted in the provision of a fully automatic press to shape and vulcanize pneumatic tires without using an inflatable diaphragm or former.

In the press shown herein, certain parts, including the mechanism for raising and lowering the movable mold section may be used with or without an inflatable diaphragm. This is clearly apparent from applicant's prior United States Patents Nos. 2,808,618; 2,812,544; 2,812,- 545; 2,812,546; and 2,846,722, to which reference may be made for further details. However, the present invention may be used with any type of press operating mechanism as long as the final closing movement is vertical, and in which the upper mold when open, may be moved backwardly or otherwise out of the way to a sufficient extent to enable the band to be placed in proper position on the lower bead ring.

The present invention is also shown as being utilized with a press having center mechanism of the type disclosed in applicant's copending application, Serial No. 714,999, filed February 13, 1958. This center mechanism includes a vertically movable lower mold ring as well as a collapsible and expansible segmental ring which is used to engage and hold the tire beads during curing, and which ring during collapse is wholly within the projected inner circumference of the tire beads, so that an uncured tire band may be released from above to allow its lower bead to properly seat on the lower mold ring. However, the invention is not limited to use with presses having this type of center mechanism, since presses having other types of center mechanism which do not require an inflatable diaphragm also may be utilized. Also the invention may be used with presses that require the use of an air bag or former, particularly presses wherein the former plays no substantial part in guiding and/or centering the band in the press.

The present tire band loading mechanism, while somewhat similar to the tire band loading mechanism disclosed in applicant's copending application Serial No. 567,555, filed February 24, 1956, is an improvement on such mechanism.

No showing has been made of any wiring diagram with switches by which the movements of the press and other mechanisms are automatically controlled, since such details may be designed by any qualified electrical engineer when the sequence of operations is fully understood.

Referring to the drawings, the numeral 10 designates the lower, stationary mold section of a tire press having an upper, movable mold section 11. The lower mold is carried on the base 12 and the upper mold on a cross head 13 which forms one element of a toggle device, the other element of which is constituted by the side links 14 (Fig. 1). The links 14 are actuated by heavy bull gears 15 driven by a spur gear 16 and a motor 17. A guiding arm 18 is attached to each side of the cross head 13 and this arm carries two rollers 19 and 20. In the side frame 21 of the press is a vertical slot 22 for the roller 20, and also a parallel, open-ended slot 23 for the roller 19. The upper edge of each frame 21 in inclined backwardly and downwardly to provide a track 24 for the roller 19 when it passes out of the upper end of the slot 23.

As a result of the foregoing arrangement, during the latter part of the closing movement and the initial part of the opening movement of the press, the mold section 11 will move toward and from respectively, its companion mold section 10 in a straight line, with their faces parallel. This straight line movement of the mold sections during final closing is essential for the forming of the band into a tire. On opening of the press, when the upper mold 11 is raised sufficiently to cause the rollers 19 to pass out of the slots 23, they will move downwardly over the tracks 24, causing the upper mold section to tilt backwardly about the axis of the rollers 20 and clear the region above the lower mold section to a sufficient extent to allow the chuck (to be referred to later) with its tire band, to move into position to deliver the band to the press, as indicated in Fig. 2.

Located on the press structure is a transferring element or chuck, indicated in its entirety by the numeral 27, which is contracted and retracted to receive a green tire band B, and thereafter expanded and extended into a generally circular cross-sectional shape, when a band is in position thereon, to grip the band from the interior. The chuck 27 is mounted and arranged so that it is raised in position to receive an uncured band B, as indicated in solid lines in Fig. 1, and thereafter the chuck is expanded and extended to grip the band, as in broken lines in Fig. 1. The chuck with the tire band is then rotated in the direction of the arrow in Fig. 1 until it is in the Fig. 2 position aligned and centered above the lower mold section and the raised lower bead ring. The chuck is then slowly contracted so that the band will be released from the chuck and guided and centered by the chuck without tipping until it is received and centered on the lower bead ring, as in Fig. 3. Then, during full contraction, the chuck is withdrawn a predetermined distance from the lower bead ring. Thus, the chuck provides for sequential guiding, centering and withdrawal operations while loading the uncured tire band.

After loading of the uncured tire band, the lower mold ring with the band is dropped into the lower mold section 10. The withdrawal of the chuck combined with the dropping of the mold ring provides the necessary clearance so that the chuck may be rotated back to its initial position to receive another uncured tire band for delivery to the mold.

When the chuck is clear of the centered tire band, mechanism is started to close the press by downward movement of the upper mold section. The closing of the press is done in a manner familar in the art and need not be described in detail. When the press closes to the position shown in Fig. 1, the tire band is shaped and then held between the two mold sections while under internal pressure until the cure is completed.

Referring particularly to the improved loading mechanism or chuck 27, this is carried by and preferably mounted radially of a shaft 30 which extends across the press and has its ends mounted in bearings at either side of the press. At one side of the press, shaft 30 rotates in a plate 31 which is welded to the inside surface of the upper end of a vertical I-beam 32, which is bolted to a vertical extension 33 arising from a front corner of the press. The upper end of the plate 31 is substantially circular, as indicated in Fig. 4. The end of the shaft 30 is extended beyond the plate 31 and is reduced and received at its outer end in a cover plate 35 bolted at 36 to the outer surface of I-beam 32. The upper end of cover plate 35 is substantially circular corresponding to plate 31, and these portions of the plates constitute a housing to receive the mechanism by which shaft 30 is oscillated. Surrounding this housing is a curved plate 37.

Keyed to the end of shaft 30, as at 40, is an operating gear 41 which meshes with the teeth of a vertical rack 42 located at one side of the shaft and attached to the upper end of a piston rod 43, the piston of which is located in a hydraulic cylinder 44. This cylinder is located at the front of the I-beam 32, where it is supported on a bar 45 extending across the beam and through a clevis 46 on the base of the cylinder. A pin 47 holds the cylinder in place.

The rack 42 is held in engagement with the gear 41 by a roller 50 which is rotatable with a shaft 51 set in the plates 31 and 35. Roller 50 has a central reduced portion 52 which bears against the rear side of the rack and two larger portions 53 at either side thereof. A pin 54 held in place by a bolt 55 releasably holds shaft 51 in position (Fig. 4).

Welded to the inner face of the gear 41 is a rectangular stop plate 58. The shaft 30 rotates from its upper raised position, as shown in Fig. 1, to its lowered vertical position, as shown in Fig. 2, moving in the direction of the arrow in Fig. 1. The arc of movement of shaft 30 is such that chuck 27 is directed angularly upwardly in its Fig. 1 location to be in position to receive uncured tire bands from the conveyor (to be referred to), and vertically downwardly in its Fig. 2 location to be in proper position to align with and deliver to the lower bead ring, uncured tire bands. To locate the chuck in its vertical or lowered position, the plate 58 contacts a raised portion 53 of the roller 50, while to hold the chuck in its raised position a rod 59 is inserted across the plates 31 and 35 in the path of the stop plate 58. A pin 60, which is held in position by a bolt 61, holds rod 59 in position.

If manual loading is to be employed, a shorter pin 62 is moved into the path of plate 58 to limit the arc of movement of shaft 30 to about 90° (see Figs. 4, 5 and 13–15). Pin 62 is mounted for sliding movement transversely in plate 31. When pin 62 is in the position shown in Figs. 6 and 13 it is out of the path of stop plate 58, but when moved to the right, as shown in Fig. 14, this pin will be in position to be engaged by plate 58 and limit the arc of movement of shaft 30 to about 90°. In order to increase the area of support for pin 62 in plate 31, apertured bosses 63 through which pin 62 also extends are welded to opposite faces of plate 31. Movement of pin 62 is effected by means of an elongated, rotatable, operating rod 64 which has an offset end portion 65 that extends through the outer end portion of pin 62, and is held from slipping out of the pin by a cotter pin 66.

Adjacent its upper end, the rod 64 extends between a spacer 67 welded to plate 31, and an elongated U-shaped bracket 68 bolted at 69 to the spacer, the arrangement providing a relatively long area 70 (Fig. 15) in which the rod can move. Opposed notches 71 are provided in spacer 67 and bracket 68, in which the rod lies at the end of each movement and from which it cannot be accidentally moved. Adjacent its lower end, rod 64 extends through an apertured bracket 72 welded to I-beam 32, and its lower handle portion 73 is bent at a right angle to the rod. To move pin 62 from its Fig. 13 to its Fig. 14 position, the handle 73 is grasped and rod 64 is moved upwardly to the broken line position in Fig. 13, after which it is turned through an arc of 180°. This turning of rod 64 also turns its offset end portion 65 through a similar arc, enabling end portion 65 to turn within the pin 62 and move the latter to its Fig. 14 position. The movement of rod 64 is reversed when pin 62 is returned to its Fig. 13 position.

Other pairs of aligned holes 75 may receive the rod 59 to allow for an arc of movement of shaft 30 of about 180° if it be found desirable to rotate the chuck to a position where it points upwardly when receiving the tire bands, as might be the case with some other type of automatic conveyor for the uncured bands. Also other angular positions may be employed, depending upon the requirements of any installation.

The chuck 27 is carried at the end of two parallel, angular arms 77 which are welded to the shaft 30 in alignment with the flight of the conveyor which is to deliver a tire band to the chuck and with the lower bead ring of the mold which is to receive the uncured band. Across the ends of the arms 77 a mounting block 78 is welded thereto (Figs. 4 and 7), and inwardly of the latter, a plate 79 is bolted at 80 to arms 77. Plate 79 carries a double acting cylinder 81, while block 78 has a limit switch assembly 82 attached thereto. Block 78 has a central bore to receive the reduced upper end portion of the center rod 83 of chuck 27 (as viewed in Fig. 8), and a nut 84 threaded on the upper end of rod 83 tightly secures the latter to block 78.

Cylinder 81 is pneumatic or fluid-operated and expands and contracts the chuck 27. Upper and lower connections 87 and 88 (as viewed in Fig. 4) are provided for attachment of flexible hose by which pressure is transmitted to and from the cylinder through control valves (not shown), which are operated at the proper times, as will be referred to.

The piston (not shown) in cylinder 81 has a piston rod 90 suitably connected to the iner end thereof and to a lateral extension 91 formed on the outer end of a sleeve 92 which is slidably mounted for longitudinal movement on rod 83 in response to movement of piston rod 90. A short distance inwardly of extension 91, sleeve 92 is provided with a plurality (in this instance four) of lateral lugs or ears 93, while adjacent its inner end sleeve 92 is provided with a second set of lugs or ears 94 in alignment with the first lugs. The lower end portion (as viewed in Fig. 9) of center rod 83 is reduced and slidably receives the neck portion 96 of the chuck tip or nose, indicated in its entirety by the numeral 97. Nose 97 is generally annular and dished as at 98, and has an enlarged central bore 99 (Fig. 9) which permits the neck 96 to slide back and forth on rod 83 from the shoulder 100 to the washer 101 held on the threaded end of rod 83 by a nut 102. Thus the nose 97 is movable from the full line position to the broken line position in Fig. 9 and vice versa. Neck 96 of nose 97 also has a set of lugs or ears 103 extending laterally therefrom in alignment with ears 93 and 94. One portion of nose 97 may be flattened as at 105 to provide a contoured surface to more easily receive a tire band on the chuck from the conveyor.

The body portion of the chuck 27 comprises four arcuate panels or segments 106, which are slightly longer than the maximum width of a tire band which they are adapted to receive. Located on the interior of each extruded segment 106, between ears 93 and 94, is a pair of spaced bearing webs 107 (Fig. 10). A link 110 having bifurcated ends is connected between each ear 93 and each pair of bearing webs 107 by means of pivot pins 111 and 112, respectively. A pair of toggle links 114 and 115 each having bifurcated ends are pivotally mounted on a pin 116 carried by each pair of bearing webs 107, and each link 114 is connected to an ear 94 by a pivot pin 117, while each link 115 is connected to an ear 103 by a pivot pin 118. Bolted to the inner end portion of two oppositely disposed chuck panels 106 is a pair of lateral wings or ledges 120 which act (as in Fig. 1) to limit the longitudinal movement of a tire band B as it is initially received on chuck 27.

The expansion and contraction as well as the extension and retraction of chuck 27 is through the movement of piston rod 90. When rod 90 moves outwardly from mounting block 78, as viewed in Fig. 9, sleeve 92 moves longitudinally on center rod 83 from its full line position toward its broken line position. The initial movement of sleeve 92 from the full line position, through toggle links 114—115, moves the chuck nose 97 to extended position, shown in broken lines in Fig. 9, and thereafter continued movement of this sleeve causes the chuck segments to move outwardly until their outward movement is arrested by the presence of a tire band B, as indicated in broken lines in Figs. 1 and 9.

In the event there is no tire band on the chuck 27 at the time it is expanded when it is in its upper, loading position, as in Fig. 1, mechanism is provided to reverse the movement of the chuck segments to return them to collapsed position to receive a tire band and to index the band supplying conveyor to deliver a band to the chuck. This mechanism is more clearly shown in Figs. 8, 9 and 9a, and includes a switch operating rod 122 that passes through a lateral extension 123 on sleeve 92 and has its outer end pivoted to a short link 124 which is part of the conventional limit switch assembly 82, and which is spring loaded to return the link and rod to a neutral position. Between extension 123 and link 124, rod 122 is provided with an exactly located collar 125, and a second exactly located collar 126 is carried by the rod near its end. The arrangement is such that when the chuck segments move from contracted expanded position, and there is a tire band on the chuck to arrest its expanded movement, the pressure on collar 125 is released permitting the link 124 to move to a neutral position, indicated by the full line position of collar 125 and link 124 in Fig. 9a. But if there is no tire band to restrain expansion of the chuck, the extension 123 on sleeve 92 will strike the collar 126 and pull rod 122 beyond its full line position in Fig. 9a, thus moving link 124 to reverse the movement of the chuck segments. This switch movement (through conventional means not shown) is arranged to function only when the chuck is in its band loading position as in Fig. 1 and causes the piston rod 90 to reverse its movement and return the chuck segments to contracted position, while it also indexes the tire band conveyor to move another tire band into position to be received on the contracted chuck. In the event no tire band is delivered by the conveyor, the above operation repeats. As sleeve 92 returns to its full line position in Fig. 9, extension 123 will strike collar 125 and move rod 122 and link 124 to the position shown in full lines in Fig. 9, and in broken lines in Fig. 9a, which will cut off the reversing means and allow chuck 27 to continue through its normal operations.

Referring to Fig. 1, the numeral 130 designates in tis entirety, a conveyor (a portion of which is shown) which is adapted to deliver uncured tire bands B to the chuck 27. This conveyor comprises a chain 131 which is guided on an inclined trackway 132 on a frame 133 located adjacent the press and which may be held in proper relation thereto by one or more braces 134 extending from the press to the frame. Pivotally mounted with respect to the chain is a series of carriers 135 provided with troughs or buckets 136 to receive the uncured bands B. The conveyor 130 also functions as a storage place from which the chuck is supplied with uncured tire bands as required. This conveyor is operated in timed sequence with the requirements of the press by a motor (not shown), and as it moves over the top, each carrier turns over and delivers a tire band to the chuck 27. After delivering its tire band to chuck 27 a carrier continues down the lower run of the conveyor and trips a limit switch 138 on the under side of the conveyor which starts the extension and expansion of chuck 27. The conveyor, carriers and buckets are shown in connection with the feeding of a single press, but it is obvious that this equipment could be duplicated for use with a dual press.

As previously explained, it is possible, if found desirable, to load the chuck 27 by hand with a tire band.

After being loaded and expanded to grip a green tire band solely from within, chuck 27 with its tire band is rotated or swung counter-clockwise (as viewed in Fig. 1) to the position in Fig. 2, in vertical alignment with the raised lower mold ring 140. The rotation of the chuck and band is initiated by a limit switch 141 on a conveyor (to be refered to) which is preferably tripped by a cured tire leaving the press on the latter conveyor. The chuck 27 will bring any out-of-round tire bands into true cylindrical form so that they will seat accurately when received on the lower mold ring 140.

When chuck 27 with its tire band is in proper position above mold ring 140, a cam roller 143 (Fig. 5) trips a limit switch 144 on plate 31 which starts chuck 27 to slowly contract and retract its segments and nose, respectively. Roller 143 is mounted on a cam 145 carried on shaft 30. As chuck 27 contracts, the tire band drops onto the lower mold ring 140, and the chuck guides the band in its downward movement until the band reaches the position shown in Fig. 3, and centers it on the mold ring.

As previously stated, the lower mold ring 140 of the tire press, in this instance, is part of a center mechanism of the type shown in applicant's copending application, Serial No. 714,999, filed February 13, 1958, which mechanism includes a segmental ring 147 which is expansible to engage and hold the tire beads during shaping and curing of the tire band, and which is collapsible, while a cured tire is being removed from the press, to a position wholly within the projected inner circumference of the tire beads. The collapsed position of the ring 147 is shown in Figs. 2 and 3, and it will be noted that the uncured band readily passes by the collapsed ring as it becomes centered on mold ring 140. As also disclosed in applicant's said copending application, after the tire band is seated on ring 140, the latter is lowered, with the tire band into seating relation in the lower mold section. For further details regarding the operation of this center mechanism reference may be made to said copending application.

This mechanism of applicant's said copending application Serial No. 714,999 is shown by way of example only and not by way of limitation, since it is apparent that the invention may be used with presses having other types of center mechanism, and it may even be used with presses that require the use of an air bag or former, particularly when such air bag is moved out of the way, for instance to a position below the lower mold ring, at the time the tire band is being delivered to the press.

While the chuck 27 retracts and expands more slowly than it extends and contracts, it will soon be completely retracted, and when it is retracted while in its vertical (Fig. 3) position, the switch operating rod 122 initiates a series of operations which are different from the operations initiated thereby when the chuck is retracted in its upright (Fig. 1) position. When the chuck retracts in its Fig. 3 position, the broken line position of link 124 in Fig. 9a operates the switch assembly 82 to lower the mold ring 140 and the tire band B which it is supporting, into seating position in the lower mold section 10. After the lower mold ring is completely dropped, a suitable switch, located in the lower mold section, will cause the chuck 27 to swing or rotate back to its starting position, and move the upper mold section 11 to close the press so as to shape and cure the tire band.

The timing of these operations is such that mold ring 140 and the tire band are first seated in lower mold section 10. Then as soon as the upper edge of the tire band is below the lower end of chuck 27, the latter is returned to its Fig. 1 position by rotating shaft 30 clockwise (as viewed in Fig. 3). Thereafter, when chuck 27 has reached a position where it cannot interfere with the closing of the press, the upper mold section 11 is moved to its closed Fig. 1 position.

When chuck 27 is returned to its starting position roller 143 on cam 145 will trip a limit switch 150 (Fig. 5) mounted on plate 31 which indexes the conveyor 130 so that it will deliver another green tire band to the retracted chuck.

The press is set to open automatically after a predetermined curing time, and the cured tire is raised with the lower mold ring from the lower mold section preferably in the manner disclosed in applicant's said copending application, Serial No. 714,999. Stripping arms 152 and 153 preferably of the type shown in applicant's Patent No. 2,882,992,, issued May 6, 1958, are timed in the operations to move beneath the cured tire, strip it from the lower mold ring and eject it onto a gravity conveyor 155 which carries it away from the press. It is conveyor 155 that preferably carries limit switch 141 that is tripped by a cured tire leaving the press, to initiate the rotation of chuck 27 to its Fig. 2 position.

In the event the chuck 27 is not clear of the upper mold section 11 as the press closes, a safety bar 157 will strike the chuck and the closing movement of the press will be arrested.

The form of conveyor for delivering the green tire bands is selected for convenience only, as other forms may be used. Also, the form of mechanism for stripping the cured tire from the press, and the form of conveyor for removing the cured tires from the press, have been selected for convenience only, and other forms may be used.

While there has been shown a preferred embodiment of the invention, it will be apparent that the invention is not limited thereto, and that changes and modifications may be made therein without departing from the spirit of the invention or from the scope of the subjoined claims.

What is claimed is:

1. In a tire press for shaping and curing unvulcanized tire bands within separable upper and lower mold sections, said press being adapted when open to receive an uncured band in registry with a lower mold section and having upright members on opposite sides of said lower mold section, a rotatable support extending between said upright members above said lower mold section, a transfer device carried by said support radially thereof and having a chuck thereon to hold a band in cylindrical form, said chuck having a plurality of radially movable tire band engaging segments and a nose portion which is movable axially of said chuck to an extended position such that the distance between the lower mold section and the nose portion is less than the length of said tire band to allow said chuck to guide said band into seating engagement in said lower mold section, means to rotate said support and to move said chuck into registry with said lower mold section, and means to contract said chuck segments to release said band when so registered and to retract said nose portion from said band.

2. In a tire press for shaping and curing unvulcanized tire bands within separable mold sections, said press being adapted when open to receive an uncured band in registry with said mold sections and having stationary members on opposite sides of said mold sections, a movable transfer device supported between said stationary members and having a chuck thereon to hold a band in cylindrical form, said chuck having a plurality of radially movable tire band engaging segments and a nose portion which is movable axially of said chuck to an extended position such that the distance between the lower mold section and the nose portion is less than the length of said tire band to allow said chuck to guide said band into seating engagement in said lower mold section, means to move said transfer device toward said mold sections, and means to contract said chuck segments to release said band when so registered and to retract said nose portion from said band.

3. In a press for shaping and vulcanizing pneumatic tires from uncured tire bands, said press having relatively movable upper and lower mold sections, a bead seating means in said lower mold section, and a chuck having means to hold a tire band in cylindrical form, said chuck having a plurality of radially movable tire band engaging segments and a nose portion which is movable axially of said chuck to an extended position such that the distance between the lower mold section and the nose portion is less than the length of said tire band to allow said chuck to guide said band into seating engagement on said bead seating means, means to move the chuck into and out of vertical alignment with said bead seating means when the press is open, means operative when the chuck is aligned with said bead seating means to contract said engaging segments to deposit said band on said bead seating means, and thereafter to retract said nose portion from said band.

References Cited in the file of this patent

UNITED STATES PATENTS

| | | |
|---|---|---|
| 2,812,544 | Soderquist | Nov. 12, 1957 |
| 2,846,722 | Soderquist | Aug. 12, 1958 |
| 2,927,343 | Soderquist | Mar. 8, 1960 |

FOREIGN PATENTS

| | | |
|---|---|---|
| 1,149,832 | France | May 22, 1956 |

UNITED STATES PATENT OFFICE
CERTIFICATE OF CORRECTION

Patent No. 2,976,566                      March 28, 1961

Leslie E. Soderquist

It is hereby certified that error appears in the above numbered patent requiring correction and that the said Letters Patent should read as corrected below.

Column 3, line 44, for "in inclined" read -- is inclined --; column 4, line 33, for "arising" read -- rising --; column 6, line 62, after "contracted" insert -- to --; column 8, line 45, for "Patent No. 2,882,992," read -- Patent No. 2,832,992, --.

Signed and sealed this 28th day of November 1961.

(SEAL)
Attest:

ERNEST W. SWIDER
Attesting Officer

DAVID L. LADD
Commissioner of Patents

USCOMM-DC